(12) United States Patent
Tarbouriech et al.

(10) Patent No.: US 6,910,004 B2
(45) Date of Patent: Jun. 21, 2005

(54) METHOD AND COMPUTER SYSTEM FOR PART-OF-SPEECH TAGGING OF INCOMPLETE SENTENCES

(75) Inventors: Nelly Tarbouriech, Meylan (FR); Herve Poirier, Meylan (FR)

(73) Assignee: Xerox Corporation, Stamford, CT (US)

( * ) Notice: Subject to any disclaimer, the term of this patent is extended or adjusted under 35 U.S.C. 154(b) by 935 days.

(21) Appl. No.: 09/738,987

(22) Filed: Dec. 19, 2000

(65) Prior Publication Data

US 2002/0077806 A1 Jun. 20, 2002

(51) Int. Cl.[7] .......................... G06F 17/28; G06F 17/27
(52) U.S. Cl. .................. 704/9; 704/4; 707/4
(58) Field of Search ............... 704/4, 9, 257; 707/4; 715/53 E

(56) References Cited

U.S. PATENT DOCUMENTS

| | | | |
|---|---|---|---|
| 5,610,812 A | 3/1997 | Schabes et al. | 395/759 |
| 5,822,731 A | 10/1998 | Schultz | 704/256 |
| 5,890,103 A | 3/1999 | Carus | 704/9 |

FOREIGN PATENT DOCUMENTS

| | | |
|---|---|---|
| EP | 0 886 226 A1 | 12/1998 |
| EP | 1 018 683 A2 | 7/2000 |
| WO | WO 99/01828 A1 | 1/1999 |
| WO | WO 00/30070 A2 | 5/2000 |

OTHER PUBLICATIONS

Berger et al., A Maximum Entropy Approach to Natural Language Processing, 1996, Computational Linguistics, 22 (1), pp. 39–68.*
Ratnaparkhi, A Maximum Entropy Model for Part–Of–Speech Tagging, 1996, in Proceedings of the Conference on Empirical Methods in Natural Language Processing, pp. 133–142.*
Ratnaparkhi, Learning to Parse Natural Language with Maximum Entropy Models, Feb. 1999, in Machine Learning, 34, pp. 151–175.*

* cited by examiner

*Primary Examiner*—Richmond Dorvil
*Assistant Examiner*—V. Paul Harper
(74) *Attorney, Agent, or Firm*—Oliff & Berridge, PLC

(57) ABSTRACT

The invention relates to a method and a computer system for enhanced part-of-speech (POS-) tagging as well as grammatically disambiguating a phrase. A phrase is usually a short multiword expression that may be ambiguous. By introducing grammatical constraints the invention supports POS-tagging as well as grammatically disambiguating the phrase. According to an identifier for the phrase, the phrase is supplemented with artificial context information. The supplemented phrase is then POS-tagged or grammatically disambiguated. Important applications are POS-tagging, Automatic Term Encoding, Headword Detection and Information Retrieval.

19 Claims, 6 Drawing Sheets

METHOD AND COMPUTER SYSTEM FOR PART-OF-SPEECH TAGGING OF INCOMPLETE SENTENCES

BACKGROUND OF THE INVENTION

1. Field of the Invention

The invention generally relates to a method and a computer system for disambiguating a phrase in a linguistic system, and in particular to part-of-speech tagging.

2. Description of the Related Art

Several techniques have been developed for part-of-speech (POS) tagging. The function of a part-of-speech tagger is to associate each word or corresponding sub-unit in a text with an abstract morpho-syntactic category being represented by a tag. POS-tagged text is used in a variety of text manipulation processes, for example in a parser or syntactical analyzer allowing the recognition, extraction and normalization of semantic structures in the text. These structures may be used for text mining, indexing, understanding, and dialog systems.

In the following part-of-speech tags are for briefness also denoted as tags or POS-tags. The abstraction to general categories in a POS-tagger allows the creation of effective multilinguistic parsers, since text analysis rules can be described using a limited number of categories rather than using specific rules for each of the languages.

Typically a POS-tagger performs three functions:

1) Tokenization: breaking a stream of text characters into tokens,

2) Lexical lookup: providing all potential part-of-speech tags for each token, and 3) Disambiguation: assigning a single part-of-speech tag to each token.

In experimental settings, POS-taggers can attain correct assignment of POS-tags with a success rate of more than 95% accuracy, but these tests are usually performed on text comprising complete sentences. In real-world applications, however, documents often contain text composed of incomplete sentences: e.g. titles, lists of items, subheadings. Such phrases are often incorrectly tagged by POS-taggers.

Technical manuals typically comprise a list of instructions including words like "press", "open" or "hold" as first tokens. These words are ambiguous since they exist in the lexicon as either nouns or verbs. If the phrase is short, e.g. "close the door" and the POS-tagger is not trained for grammatical structures beginning with a verb, the POS-tagger will not be able to disambiguate the phrase. For the phrase "Train Schedules", being another example for a phrase meaning "time tables for trains", in common POS-taggers one of both words would be identified to be a verb.

Common disambiguation methods usually lead to partial inaccurate results for short phrases. Therefore manual POS-tagging, corresponding to a user imitating the POS-tagger, often has to be performed.

SUMMARY OF THE INVENTION

The present invention has been made in consideration of the above situation, and has its primary object to enhance the quality of a POS-tagger.

Another object of the invention is to provide a method and a computer system for supporting a POS-tagger in disambiguating a phrase, by introducing grammatical constraints.

It is yet another object of the invention to supply a method and a computer system for providing artificial grammatical context for a phrase to improve tagging performance of the phrase.

A further object of the present invention is to provide method and a computer system for POS-tagging of a phrase based on the phrase supplemented with context information.

It is still another object of the invention to provide an Automatic Term Encoding process based on the above method. Another object of the present invention is to provide a process extracting a headword out of the phrase based on the above method.

To achieve these objects, the present invention provides in a first aspect a method for assigning at least one part-of-speech tag to a phrase. The method comprises the steps of obtaining an identifier for the phrase, the identifier being associated with context information; supplementing the phrase with the context information; and assigning at least one POS-tag to the phrase based on the supplemented phrase.

According to a second aspect of the present invention, there is provided a method for grammatically disambiguating a phrase. The method comprises the steps of getting the phrase and getting an identifier for the phrase, the identifier being associated with artificial information; supplementing the phrase with the artificial information; and grammatically disambiguating the phrase based on the supplemented phrase.

According to a third aspect of the present invention, there is provided a computer system for part-of-speech tagging of a phrase, the computer system comprising identifier input means for training an identifier associated to context information, a context storage comprising a plurality of context information items, an identifier storage connected to the context storage and comprising a plurality of identifiers each of which being associated with at least one context information item of the plurality of context information items. The computer system further comprises a context supplementer, connected to the identifier input and the context storage, for supplementing the phrase with the associated context information of the obtained identifier; and a POS-tagger, connected to the context supplementer, for identifying the part of speech of each part of the phrase based on the supplemented phrase.

By using these approaches of the invention phrases can be disambiguated more accurately.

In preferred embodiments, further improvements can be achieved by using a main grammatical category of the phrase as the identifier thereby being easier to understand and to select.

In further preferred embodiments, structural information of the phrase in a plurality of phrases or textual information is used to define the identifier for the phrase. Besides being easy to determine, the identifier being defined in such a way is applicable to a plurality of phrases at once, e.g. to instruction lists, groups of database contents or similar groups of phrases.

In preferred embodiments, the method of the present invention is used for a headword extracting application or for deriving a formal structure of the phrase for an Automatic Term Encoding process.

BRIEF DESCRIPTION OF THE DRAWINGS

The accompanying drawings are incorporated into and form a part of the specification to illustrate several embodiments of the present invention. These drawings together with a description serve to explain the principles of the invention. The drawings are only for the purpose of illustrating preferred and alternative examples of how the invention can be used and are not to be construed as limiting the invention to only the illustrated and described embodiments.

Further features and advantages will become apparent from the following and more particular description of the various embodiments of the invention, as illustrated in the accompanying drawings, wherein.

DETAILED DESCRIPTION

The illustrated embodiment of the present invention will now be described with reference to the drawings.

Figure 1:
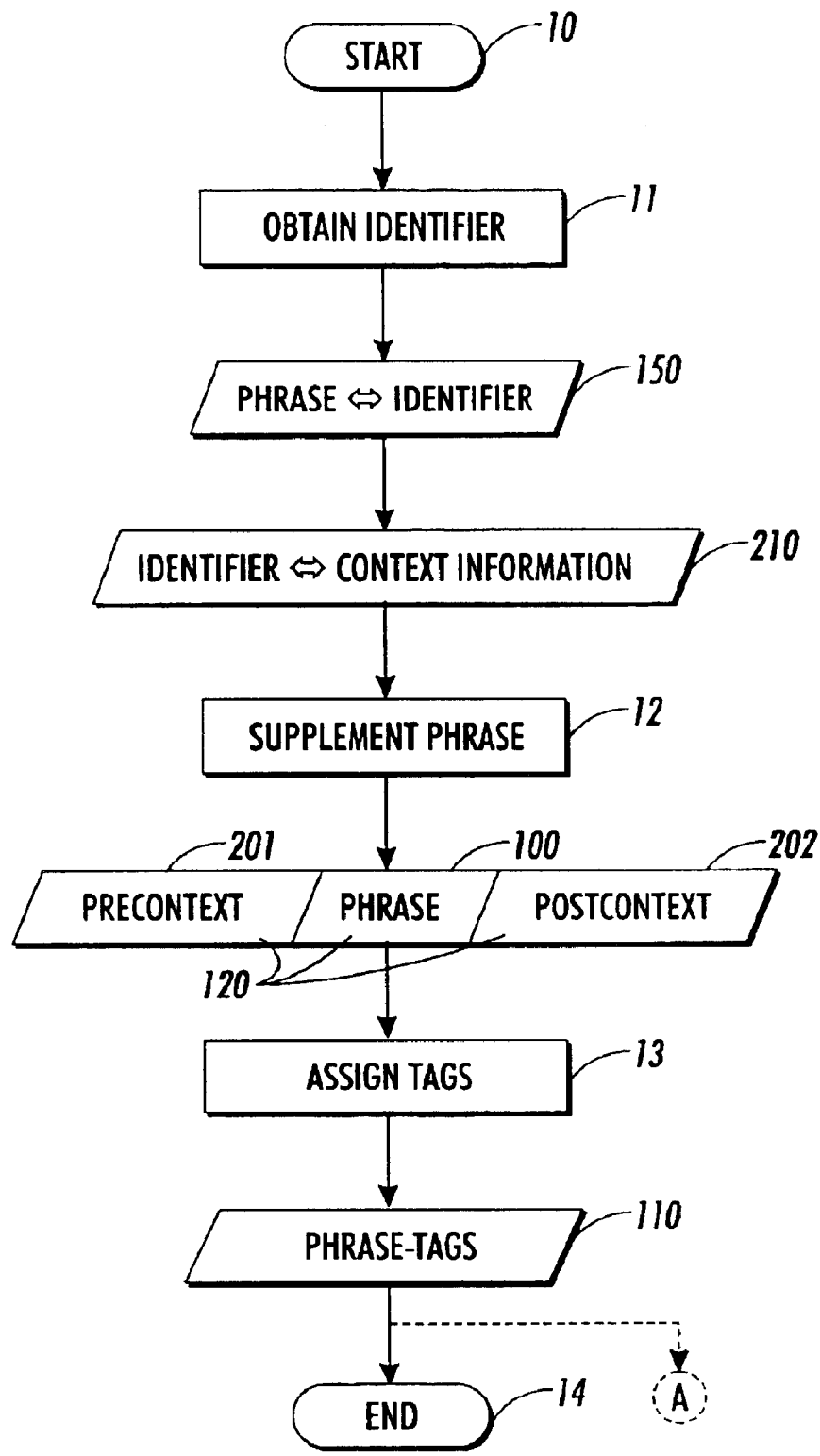
FIG. 1 is a flowchart illustrating a method according to a preferred embodiment of the invention.

Referring now to the drawings and particularly to FIG. 1, which illustrates a preferred embodiment of a method for use in a POS-tagging process, the first aspect of the present invention will be discussed. The first step in the method from Start 10 to End 14 is the step 11 of obtaining an identifier, then the phrase 100 is associated 150 to the identifier. The identifier is associated 210 to context information which in step 12 is supplemented to the phrase 100. In a preferred embodiment of the present invention, the context information comprises at least pre-context 201 or post-context 202 information. The supplemented phrase 120 is tagged by the POS tagger in step 13. The part corresponding to the original phrase 100 is retrieved in step 110.

A phrase may be defined as comprising at least one part of a natural or artificial language.

Optionally the method for POS-tagging may be continued as indicated by the dotted line connected to dotted connection point A. Such optional steps are discussed below with reference to FIG. 3.

In an exemplary implementation of the method of FIG. 1, the identifier is a main grammatical category of the phrase. In another embodiment of the present invention, the identifier is defined by a structural property of the phrase (e.g. headline, instruction list).

The steps shown in FIG. 1 are discussed in detail in the following for the phrase "close the door".

In a POS-tagger supplementing a context, at least two different identifiers or grammatical categories are defined, for example: VerbPhrase or NounPhrase for phrases which as a whole grammatically represent a noun or a verb. Corresponding to the method of the present invention a verb/noun phrase will be supplemented by Verb/NounPhrase context information for the POS-tagging or disambiguating of the phrase. In this example the POS-tagger uses the following VerbPhrase and NounPhrase context information:

English.Pre-context.NounPhrase: "the", English.Post-context.NounPhrase: "who works well";

English.Pre-context.VerbPhrase: "the technicians", English.Post-context.VerbPhrase: "to someone".

The context information may comprise textual information, POS-tags or information adapted for the POS-tagger.

Referring to FIG. 1, for the phrase "close the door" the identifier for the category VerbPhrase in step 11 is obtained, the identifier being associated to context information as indicated above, and the corresponding pre-context 201 and post-context information 202 in step 12 is supplemented to the phrase 100:

"The technicians close the door to someone".

Although the content of such an supplemented phrase 120 does not make sense, the POS-tagger is now able to disambiguate the parts of the phrase, because the supplemented phrase 120 represents a known grammatical structure. The POS-tagger uses the tags +VERB for verbs, +NOUN_SG for singular nouns, +NOUN_PL for plural nouns, +ART for articles, +PREP for preposition, +PRON for pronouns, +SENT for end of sentence marker for the step 13 of assigning the at least one POS-tag to the phrase 120:

"the+ART technician+NOUN_PL close+VERB the+ART door+NOUN_SG to+PREP someone+PRON.+SENT".

The supplemented context information is removed from the phrase when the POS-tagging process is finished. The result of step 110 is:

"close+VERB the+ART door+NOUN_SG".

The step 11 of obtaining the identifier may be implemented in various manners for example the phrase "close the door" could be part of an instruction list in a document thereby being associated to the identifier for the grammatical category VerbPhrase. Further the phrase could be an input by an user, the identifier being automatically obtained on evaluation of an interaction history with the user or even manually obtained by input of the user.

A second aspect of the invention is described in the following: a method for use in a computer system for grammatically disambiguating a phrase comprises the steps of getting the phrase; getting an identifier for the phrase, the identifier being associated to artificial information; supplementing the phrase with the artificial information and grammatically disambiguating the phrase based on the supplemented phrase.

It is apparent that this second method is not limited to POS-taggers and can be seen as a more general version of the first method of the invention. Therefore all parts of the detailed description of the present invention above and following below are applicable to the second method as well although they are discussed with reference to the first method of the present invention only.

The method illustrated in FIG. 1 improves prior art POS-tagging processes. An example for the basic steps of POS-tagging, as indicated already in the introductory part of this application, is illustrated in FIG. 6.

Figure 6:
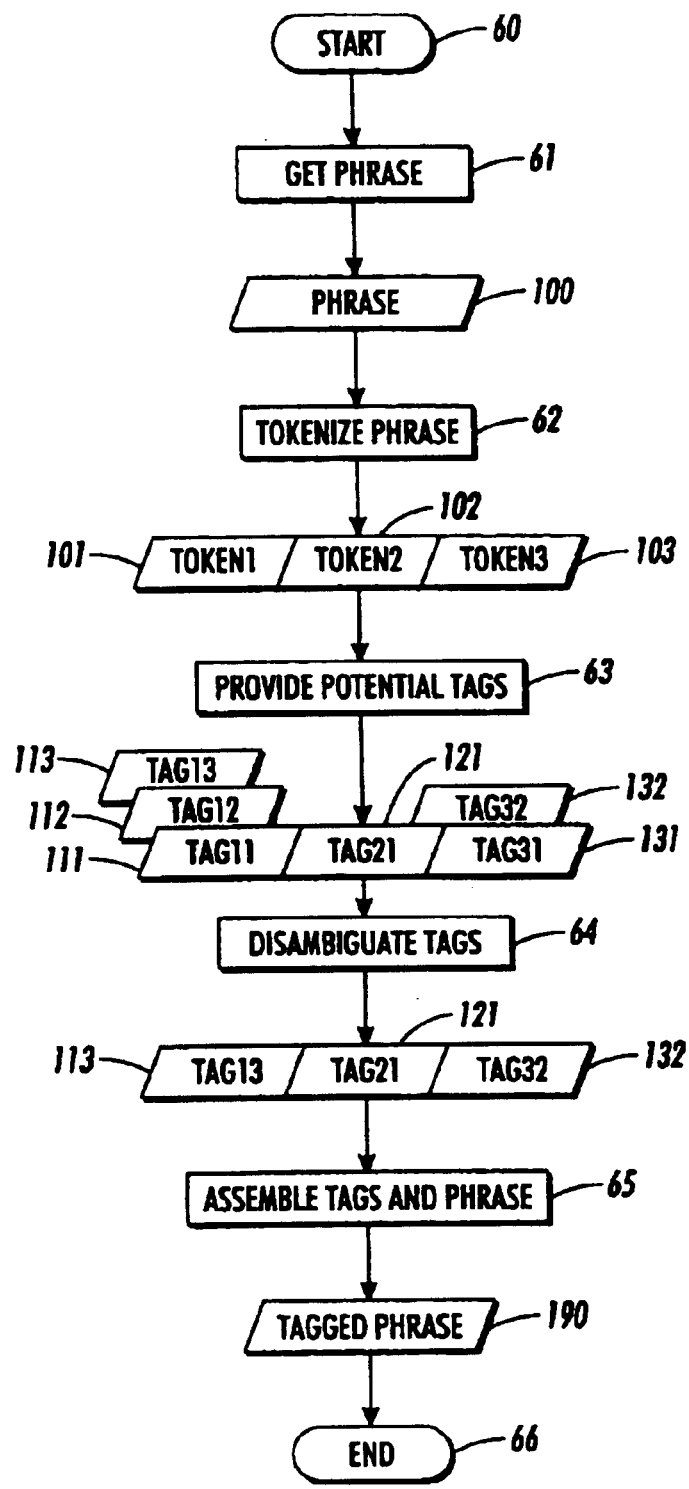
FIG. 6 is a flowchart illustrating a prior art POS-tagging process.

FIG. 6 illustrates the steps in a common POS-tagger from start 60 to end 66. After the step 61 of getting a phrase 100, it is tokenised in step 62 into Token1 to Token3 101 to 103. Potential tags Tag11 to Tag32 111–132 are provided in step 63 by evaluating each token 101–103 based on lexical information. The step 63 of providing potential tags 111–132 may comprise a morphological analysis of the tokens 101–103. For example, for identifying a word "swam" as a simple past tense of the verb "swim". In step 64 by disambiguating the tags 111–132 a single tag 113, 121, 132 is assigned to each token 101, 102, 103. The disambiguated tags 113, 121 and 132 are assembled to the tokens 101, 102, 103 of the phrase 100 in step 65 resulting in the tagged phrase 190.

Some prior art POS-taggers for example use Finite State Transducers (FSTs) or Hidden Markov Models (HMM) in the POS-tagging process. However, the method of the present invention is applicable to any prior art POS-tagger.

The steps of the method of the present invention may be combined with prior art POS-tagging processes in various manners, some of them will be discussed in the following with reference to FIG. 1 and FIG. 2.

In an embodiment of the present invention the steps 11 and 12 of obtaining the identifier and supplementing the phrase can be performed with the step 61 of getting the phrase, wherein the step 13 of assigning the text summarizes the steps 63 and 64 of providing potential tags and disambiguating tags.

In another embodiment of the present invention the steps of the method as shown in FIG. 1 may be inserted in the step 64 of disambiguating tags, for example in case more than one potential tag is provided in step 63 for one token of the phrase.

Figure 2:
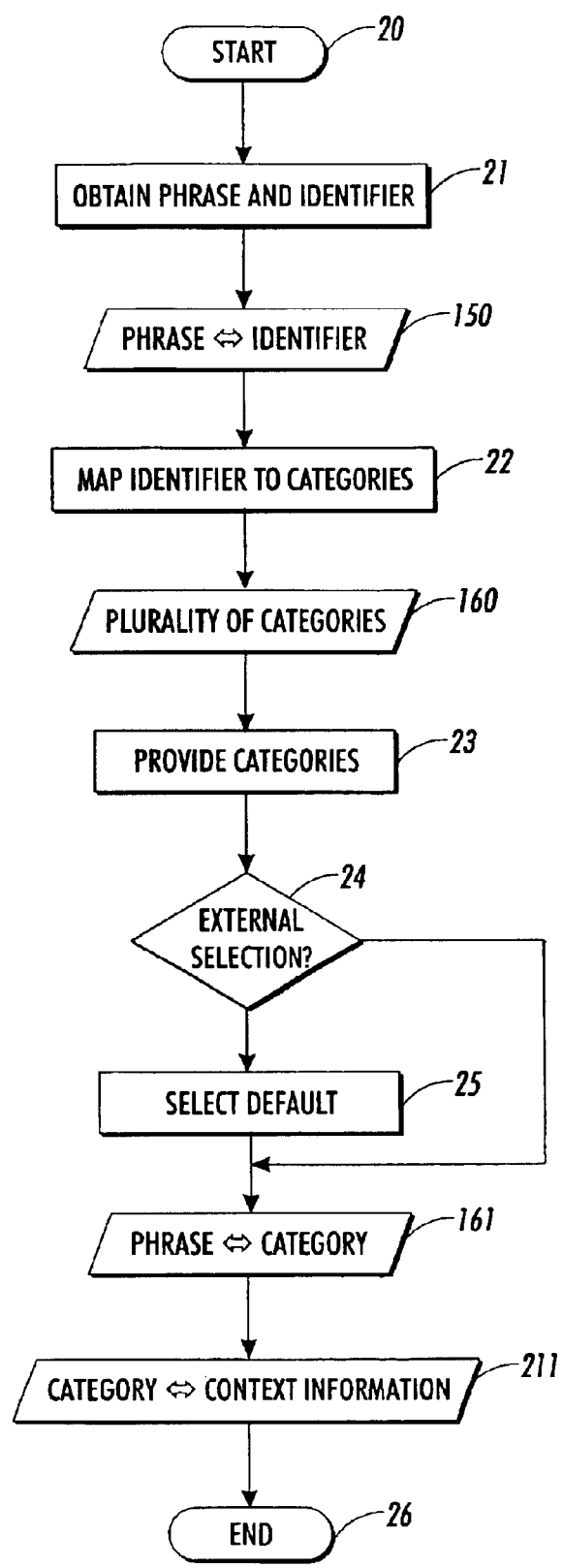
FIG. 2 is a flowchart illustrating an extension of the first step of FIG. 1 according to a preferred embodiment of the present invention.

FIG. 2 illustrates in more detail the step 11 of obtaining the identifier for a preferred embodiment of the present invention from Start 20 to End 26. The phrase 100 and the associated 150 identifier in step 21 are obtained, and the identifier is mapped in step 22 to a plurality of potential categories 160 for the phrase. The mapping actually is a step of pre-selecting categories. In a further embodiment of the present invention, the plurality of categories 160 are main grammatical categories of the phrase. The plurality of categories 160 is provided in step 23 for a selection which can be an external selection 24. In case no external selection 24 for the most probable category is made it is selected in step 25 as default. The phrase now is associated 161 to the most probable category being associated to the context information 211.

In a further embodiment of the present invention the at least one POS-tag assigned to the phrase is selected from potential POS-tags for the phrase without context and the most probable category for the phrase is selected by evaluating the potential POS-tags. In fact such an evaluation eliminates the need for the further disambiguation of the POS-tags.

Applications

Figure 3:
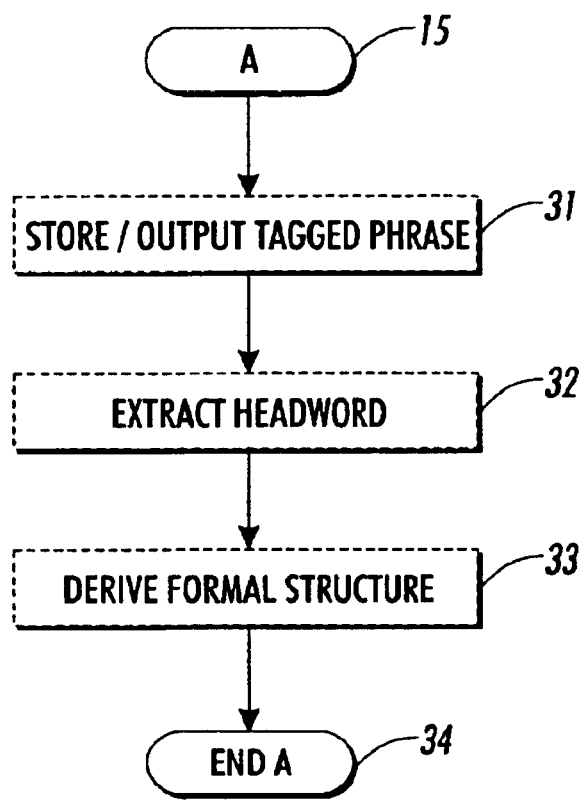
FIG. 3 is a flowchart illustrating optional applications which are based on the method of FIG. 1.

FIG. 3 illustrates ways of using the method of FIG. 1 for optional applications, starting from connection point 15 to end 34. In a first optional step 31 the tagged phrase or the phrase tags are stored or outputted. The optional step 32 of extracting a headword out of the phrase based on the phrase with the at least one assigned POS-tag is another application using the method of the present invention. In another embodiment of the present invention in a further optional step 33 a formal structure for the phrase is derived, that covers variations of the original phrase. The steps 32 and 33 are discussed in more detail in the following.

Many existing applications in natural language processing (e.g. dictionary generation, terminology database creation) require the part of speech encoding of expressions. Currently lexicographers perform this encoding manually according to some specific grammar. This manual encoding can be improved and speeded up by an automatic process called Automatic Term Encoding. The step 33 of deriving a formal structure is the final step of the Automatic Term Encoding process which results in the automatic creation of linguistic regular expressions that can be used by natural language processing tools.

For example, the phrase "close the door" could be a part of a traveling dictionary including short phrases for everyday use, which has to be translated into different languages. The lexicographers specify this phrase as the term they want to encode and provide the general grammatical category for the phrase. The latter may also be derived by a structural property of the phrase, e.g. in case the phrase is part of an instruction list. Again the grammatical category obtained in this example is VerbPhrase. The tagged phrase "close +VERB the +ART door +NOUN_SG"

is used to generate a regular expression capturing variations of the phrase.

Syntactic categories resulting from the tagging process are mapped to more general grammatical tags. The POS-tag +VERB resulting from disambiguating and identifying the affected verb is mapped to the more generic qualifier V, which covers all types of verbs. The POS-tags +NOUN_SG (for noun, proper noun, or abbreviation), are replaced by the global qualifier N to which all noun tags are mapped. These generic tags generalize the initial expression. The mapping rules can also insert additional information: for example, a rule can specify that adjectives can be inserted between two nouns or that several adverbs can be added after a verb. The rules applied by the method in the step of deriving a formal structure 33 are language and tagger dependent. The phrase finally leads to the formal structure:

"close V: ADV* the D: door N:".

This formal structure captures variations of the original expression such as:

"close the doors", or

"closing firmly the door".

Automatic Term Encoding improves the work of language resource creators, automating a part of process of building dictionaries, terminology databases etc. This changes the role of the resource creator having more time for validation by automating the tedious parts of the encoding process. In addition to saving time, the rule application in the Automatic Term Encoding application ensures that the encoding (e.g. choice of generalization tags) is homogenous since the mapping is not performed manually and the resource creator merely guides the tagger rather than imitates it.

A further application of this invention involves information retrieval, taking advantage of the methods described above by using the result of the Automatic Term Encoding. Based on the formal structure resulting from Automatic Term Encoding, an application can determine all the different variations of a multiword expression thereby catching all the terms matching the regular expression. For example, for the phrase: "dense matrix" we will get the following results from the different steps of the Automatic Term Encoding process:

a) Disambiguation results: "dense +ADJ matrix +NOUN_SG"

b) Automatic Term Encoding result: "dense A: ADJ* matrix N:"

A specific automatically applied grammar rule has added the possibility of having zero or more adjectives (ADJ for adjective) before a noun.

Equivalent expressions can now be identified, which match this regular expression, for example:

a) dense square matrix b) real dense square matrix c) large and real dense square matrix.

Adding further grammar rules extends the variety of expression that can be caught.

The step 32 in FIG. 3 of extracting a headword out of the phrase based on the phrase with at least one assigned POS-tag is the next application using the method of the present invention. For example the phrase "alarm sensor switch"
can be identified as a NounPhrase by the obtained corresponding identifier. Consequently the phrase is supplemented to the sentence "the alarm sensor switch who works well".

The disambiguation of the supplemented phrase leads to the result:

"the alarm +NOUN_SG sensor +NOUN_SG switch +NOUN_SG who works well".

By applying relevant grammatical rules to the tagged phrase a headword in the phrase is identified to be "switch".

Similar to the rules for Automatic Term Encoding in the headword detection process the rules, having to be applied for extracting the headword, are also coded using regular expressions and are language as well as tagger dependent. The step 32 of headword detection may be split into the sub steps of finding all nouns in the phrase which are potential headwords and identifying the one noun which most probably is the headword of the phrase.

Functional Units

Figure 4:
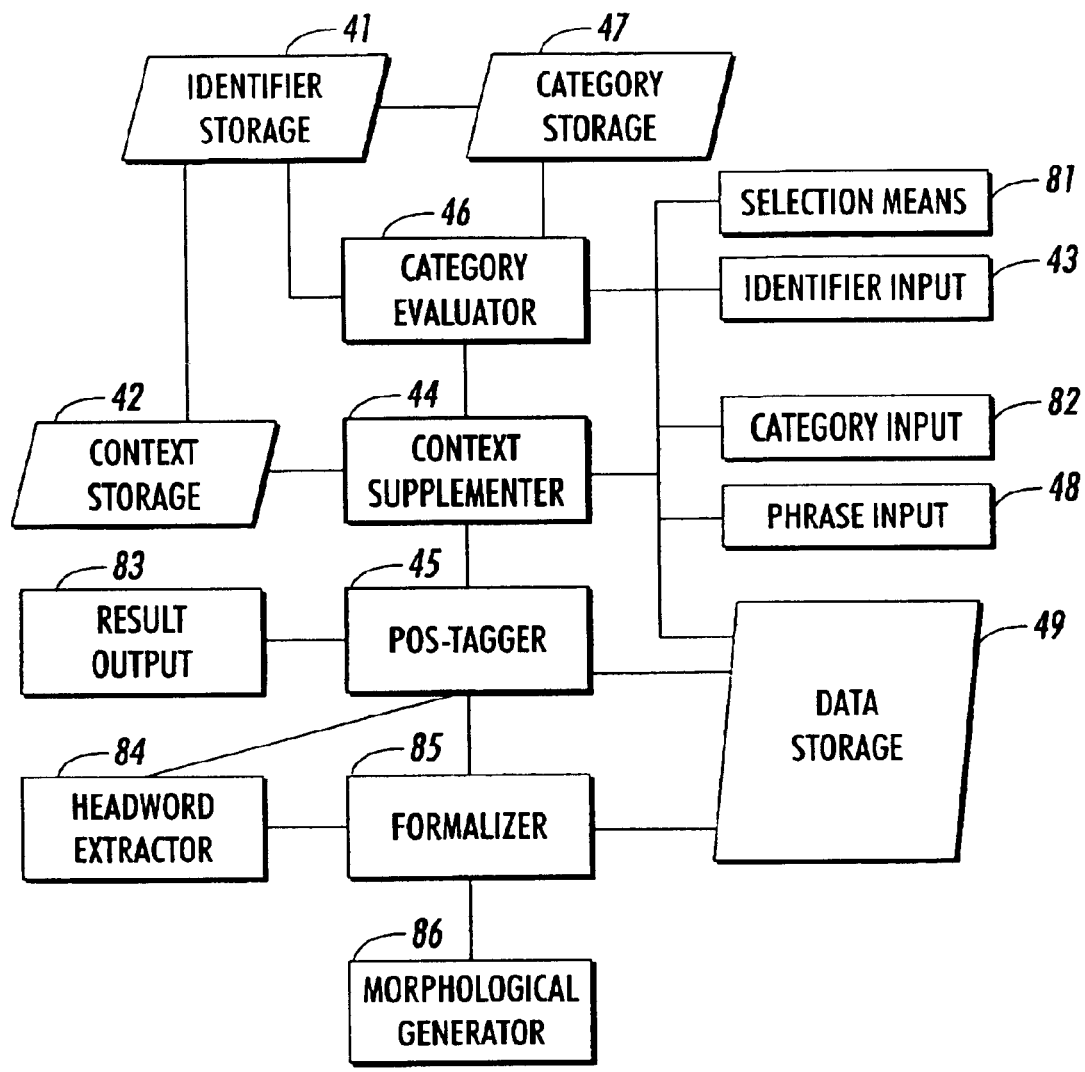
FIG. 4 illustrates functional units of a computer system for POS-tagging a phrase according to a preferred embodiment of the present invention.

In FIG. 4 the functional units involved in POS-tagging, headword extracting or formal structuring processes are illustrated.

In a first embodiment, the context supplementer 44 is connected to identifier input means 43, a POS-tagger 45 and a context storage 42, being connected to the identifier storage 41. The context supplementer 44 obtains an identifier for a phrase via the identifier input 43. Alternatively the phrase may be obtained from a data storage 49 or a phrase input 48, being connected to the context supplementer 44.

The context storage 42 comprises a plurality of context information items for being supplemented to a phrase. The identifier storage 41 comprises a plurality of identifiers, each of which being associated to at least one context information item of the context storage 42. The context supplementer 44 selects a context information item according to the obtained identifier from the context storage 42. The phrase is supplemented with the selected context information, both together being the input for the POS-tagger 45. The POS-tagger performs the POS-tagging process leading to the tagged phrase or the phrase tags. The result can be displayed or outputted at the output 83, or even stored to the data storage 49.

In a further embodiment of the present invention, the computer system further comprises a category storage 47 comprising a plurality of categories, each identifier being associated with at least one category of the category storage 47 and each category being associated to at least one context information item in the context storage 42. When a category is obtained via category input 82 the context information that has to be supplemented to the phrase can be selected directly. An obtained identifier may be mapped to the category and consequently to the context information.

In case more than one category is associated with the identifier, a category evaluator 46 performs the pre-selection of probable categories e.g. main grammatical categories for the phrase according to the identifier and selects a most probable category from the pre-selected categories. The selection may be performed by external selection via the selection means 81 or according to selection rules stored in the data storage 49.

In a further embodiment of the present invention the most probable category is selected based on potential POS-tags for the phrase, which are provided by the data storage together with the phrase.

The context information may comprise at least pre-context or post-context information, each of which may be represented by at least one POS-tag or textual information.

For the applications illustrated with reference to FIG. 3 the POS-tagger 45 may be connected to a headword extractor 84 for performing the headword extraction process based on the tagged phrase, or a formalizer 85 for deriving a formal structure for the phrase, that covers variations of the original phrase. In a further embodiment of the present invention the formalizer 85 may be connected to a morphological generator 86 and the data storage 49. The data storage 49 may function as an input or output data storage for the phrase or the tagged phrase, and further may comprise rules for POS-tagging, formalizing or headword extraction processes.

Hardware Units

Figure 5:
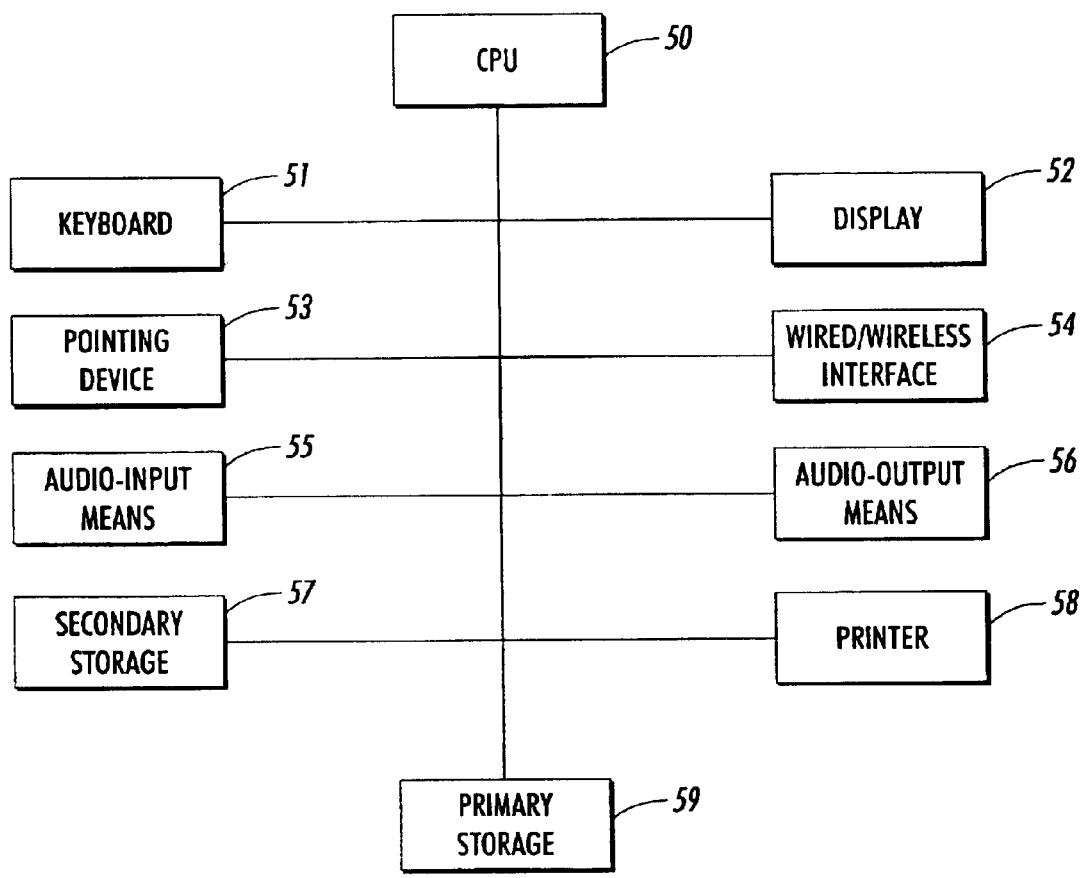
FIG. 5 illustrates the components of a computer system which may be used for implementing the present invention.

FIG. 5 illustrates a computer system with a CPU 50, a keyboard 51, a display 52, a pointing device 53, a wired/wireless interface 54, audio input means 55, audio output means 56, a secondary storage 57, printer 58 and a primary storage 59.

In view of the present invention the best mode for carrying out the invention will be described in the following: the primary storage 59 comprises a computer program comprising processor-executable instructions implementing: a context supplementer 44 for supplementing the context information to the phrase and a POS-tagger 45 for assigning the at least one POS-tag to the phrase. The primary storage 59 further includes a context storage 42 comprising a plurality of context information items and an identifier storage 41 comprising a plurality of identifiers, each of which is associated with at least one context information item of the plurality of context information items. The CPU 50 executes the processor-executable instructions stored in the primary storage 59, thereby performing the implemented methods of the present invention. The keyboard 51 may be used as identifier input 43 to obtain an identifier for a phrase. The identifier is one of the plurality of identifiers of the identifier storage 41 and therefore is associated with a context information item of the plurality of context information items. The phrase is supplemented with the context information item by the context supplementer 44. The supplemented phrase being input for the POS-tagger 45 is evaluated for assigning at least one POS-tag to the phrase. Any rules used in the POS-tagging process are stored as a part of the POS-tagger 45.

The keyboard 51 and the pointing device 53 can be used as identifier input 43, category input 82 or phrase input 48. The display 52 or the printer 58 can serve as result output 83, and in combination with the keyboard 51 or the pointing device 53 may be used as selection means 81.

The audio input means 55 can be used as one of the input means or the selection means 81, whereas the audio output means 56 can be used as the result output 83. The secondary storage 57 serves as part of the data storage 49 and may be a hard disk, CD, DVD or the like. The secondary storage typically is used for storing language dependent data, mainly because it is exchangeable.

While the invention has been described with respect to the preferred physical embodiments constructed in accordance therewith, it will be apparent to those skilled in the art that various modifications, variations and improvements of the present invention may be made in the light of the above teachings and within the preview of the appended claims without departing from the spirit and the intended scope of the invention. In addition, those areas in which it is believed that those of ordinary skill in the art are familiar, have not being described herein in order not to unnecessarily obscure the invention described herein. Accordingly it is to be understood that the invention is not to be limited by the specific illustrated embodiments, but only by the scope of the appended claims.

What is claimed is:

1. A method, for use in a computer system, for assigning at least one part-of-speech (POS) tag to a phrase, the method comprising:

obtaining an identifier for the phrase, the identifier being associated with context information;

supplementing the phrase with the context information; and assigning the at least one POS-tag to the phrase based on the supplemented phrase.

2. The method of claim 1, wherein the context information comprises at least one of pre-context and post-context information.

3. The method of claim 1, wherein the identifier is a main grammatical category of the phrase on the whole.

4. The method of claim 1, wherein the identifier is defined by a structural property of the phrase in a plurality of phrases or textual information.

5. The method of claim 1, further comprising deriving a formal structure for the phrase, that covers variations of the phrase.

6. The method of claim 1, further comprising extracting a headword out of the phrase based on the phrase with the at least one assigned POS-tag.

7. The method of claim 1, wherein the step of obtaining the identifier further comprises selecting a main grammatical category of the phrase on the whole according to the identifier, the main grammatical category being associated to the context information to be supplemented to the phrase.

8. The method of claim 1, wherein the step of obtaining the identifier further comprises:

preselecting probable main grammatical categories for the phrase according to the identifier; and selecting a most probable category from the preselected main grammatical categories, the most probable category being associated to the context information to be supplemented to the phrase.

9. The method of claim 8, wherein the step of selecting the most probable category comprises obtaining an external selection of the most probable category.

10. The method of claim 8, wherein the at least one POS-tag assigned to the phrase is selected from potential POS-tags assignable to the phrase without context information; and selecting the most probable category is supported by evaluating the potential POS-tags.

11. The method of claim 1, wherein the context information includes at least one POS-tag.

12. The method of claim 1, wherein the context information includes textual information.

13. The method of claim 1, wherein the computer system comprises:

a primary storage comprising:
a computer program comprising processor-executable instructions implementing:
a context supplementer for supplementing the context information to the phrase; and
a POS-tagger for assigning the at least one tag to the phrase;
a context storage comprising a plurality of context information items; and
an identifier storage comprising a plurality of identifiers; each of which being associated with at least one context information item of the plurality of context information items;

identifier input means for obtaining the identifier for the phrase, the identifier being associated to the context information according to the plurality of identifiers and its association to the plurality of context information items; and a processor, connected to the primary storage and the identifier input means, for executing the processor executable instructions.

14. A method, for use in a computer system, for grammatically disambiguating a phrase, the method comprising:

acquiring the phrase;

acquiring an identifier for the phrase, which is associated with artificial information, the artificial information supporting grammatical disambiguation of the phrase;

supplementing the phrase with the artificial information; and grammatically disambiguating the phrase based on the supplemented phrase.

15. A computer system for part-of-speech (POS)-tagging of a phrase, the system comprising:

identifier input means for obtaining an identifier for the phrase, the identifier being associated to context information;

a context storage comprising a plurality of context information items;

an identifier storage, connected to the context storage, comprising a plurality of identifiers; each of which being associated with at least one context information item of the plurality of context information items;

a context supplementer, connected to the identifier input and the context storage, for supplementing the phrase with the associated context information of the obtained identifier; and a POS-tagger, connected to the context supplementer, for identifying the part of speech of each part of the phrase based on the supplemented phrase.

16. The system of claim 15, further comprising phrase input means, connected to the context supplementer, for getting the phrase.

17. The system of claim 15, further comprising:

a category storage, connected to the identifier storage, for storing a plurality of categories, the identifier being associated with at least one of the plurality of categories; and a category evaluator, connected to the category storage, the identifier storage and the context supplementer, for evaluating the category of the phrase based on the identifier.

18. The system of claim 15, further comprising category input means connected to the context supplementer for obtaining a category associated to one of the context information items, which is supplemented to the phrase.

19. The system of claim 15, further comprising output means connected to the POS-tagger for outputting the at least one POS-tag.

* * * * *